United States Patent [19]

Fowler, Jr. et al.

[11] Patent Number: 4,471,222
[45] Date of Patent: Sep. 11, 1984

[54] BIFUNCTIONAL OPTICAL SENSING SYSTEM

[75] Inventors: Eugene F. Fowler, Jr.; Robert C. Gibbons, both of Richardson, Tex.

[73] Assignee: The United States of America as represented by the Secretary of the Army, Washington, D.C.

[21] Appl. No.: 385,145

[22] Filed: Jun. 4, 1982

[51] Int. Cl.³ ................. G01J 3/36; G02B 13/14
[52] U.S. Cl. .................... 250/350; 350/438; 350/1.4
[58] Field of Search .............. 250/341, 347, 339, 344, 250/349, 350, 351, 353, 226; 350/438, 1.4; 244/3.16

[56] References Cited

U.S. PATENT DOCUMENTS 2,360,403  10/1944  Dimmick ................. 350/166
2,493,110   1/1950  Corman ................... 350/1.2
3,971,939   7/1976  Andressen ............... 250/339

Primary Examiner—Janice A. Howell
Assistant Examiner—Constantine Hannaher
Attorney, Agent, or Firm—Robert P. Gibson; Anthony T. Lane; Michael C. Sachs

[57] ABSTRACT

A bifunctional sensor is disclosed for an optical seeking system which utilizes a single focussing lens arrangement for focussing light of two distinct wavelength ranges. A first detector for detecting light of the first wavelength range is provided nearest the lens system and transmits light of the second wavelength range. A second detector for detecting light of the second wavelength range is provided behind the first detector with a modulating apparatus for modulating the light of the second wavelength range before it reaches the second detector.

3 Claims, 1 Drawing Figure

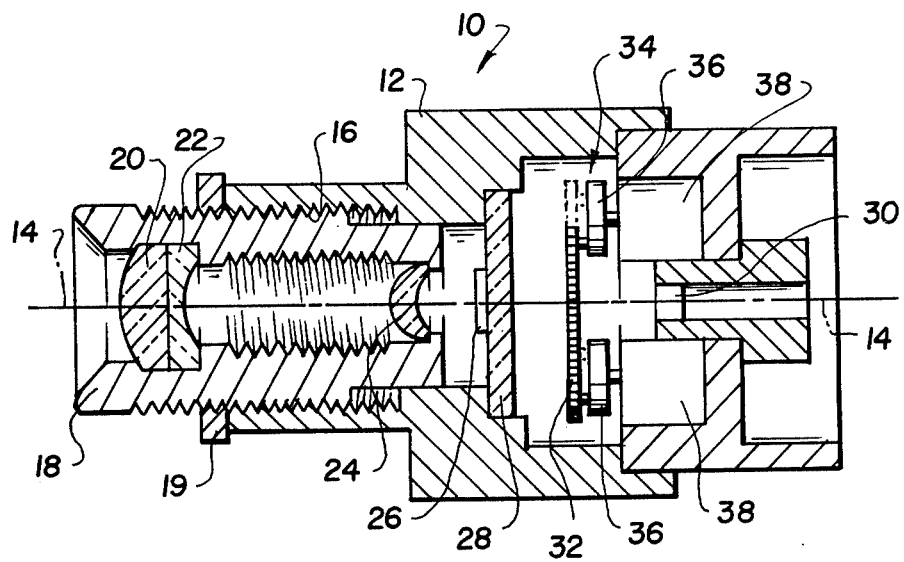

BIFUNCTIONAL OPTICAL SENSING SYSTEM

GOVERNMENTAL INTEREST

The invention described herein was made in the course of a contract with the Government and may be manufactured, used and licensed by or for the Government for government purposes without the payment to use of any royalty thereon.

FIELD AND BACKGROUND OF THE INVENTION

The present invention relates in general to an optical detector or sensor which is utilized in a seeker system for tracking a target.

The use of laser light to illuminate a target to read the position of the target is well known in the art. A laser light detector may be utilized with suitable optics provided for this purpose. It is also known to use other portions of the electromagnetic spectrum, specifically the light and near light portions of the spectrum, to detect and track a target. Videocameras for example can be utilized under good visibility conditions. Under poor visibility conditions the infrared portion of the electromagnetic spectrum can be utilized for this purpose.

An acceptable seeker system thus must operate over a wide wavelength spectrum to accommodate various target signatures and atmospheric transmission effects and conditions. Various seeker systems which are sensitive to specific wavelength ranges must be used with suitably provided detectors for the various wavelength ranges.

Prior embodiments of such overall sensor systems employed dual optical systems with completely separate detectors and processing elements. It is also known to use a single set of optics which transmit all of the wavelength regions of interest. A wavelength selective element is utilized for dividing the light into the various wavelength ranges. Such an element is a dichroic mirror.

For certain applications the completely separate optical/detector configuration may not be compatible with available space requirements. Such prior art systems are wasteful of volume and weight and relatively expensive due to the large number of optical elements required. The use of wavelength selective elements was an attempt at reducing such volume and weight requirements by reducing the number of optical elements required. The various wavelength bands were separated out and directed to discrete detector elements. This configuration however only partially solves the basic problem in that still two completely separate optical paths after wavelength separation are required.

A suitable optical system is needed which passes all wavelength regions of interest, including such as a laser detector configuration which detect one wave-length region (in the area of 1.06 micrometers) and which can transmit other wavelength regions of interest, for example the wavelength region between 3.0 and 15.0 micrometers, such as having an infrared detector which is useful in the 3.0 to 15.0 micrometer region with corresponding nutation assembly including movable reticle.

SUMMARY OF THE INVENTION

The present invention provides a bifunctional seeker system with improved performance. The invention utilizes a wide band optical system for transmitting electromagnetic radiation, specifically in the light and near light regions, having all wavelength ranges of interest. Field of view, optical transmission and resolution is provided for field operations over a wide range of ambient temperature conditions.

Accordingly an object of the invention is to provide a bifunctional seeker sensor which has an athermalized optical design and makes use of existing interocular space to accommodate a detector element for short wavelength light and another detector for longer wavelength light.

Another object of the invention is to provide a bifunctional seeker sensor which permits a compact and lightweight construction using minimal optical elements and providing dual wavelength sensing.

A still further object of the invention is to provide a bifunctional seeker sensor which comprises a mounting head having a longitudinal axis, focusing means connected to the head for passing and focusing electromagnetic radiation of at least two distinct wavelength ranges along the longitudinal axis, a first detector connected to the head and spanning the axis for receiving the shorter wavelength range and transmitting the longer wavelength range and a second detector spanning the longitudinal axis for receiving the radiation of the longer wavelength range.

Another object of the invention is to provide a bifunctional seeker system which automatically corrects for focal plane shift due to changes in ambient temperature.

A still further object of the invention is to provide a bifunctional seeker sensor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings, and descriptive matter in which a preferred embodiment of the invention is illustrated.

BRIEF DESCRIPTION OF THE DRAWINGS

The only drawing in the case is a sectional view taken along the longitudinal axis of a bifunctional seeker sensor according to the invention.

DESCRIPTION OF THE PREFERRED EMBODIMENT

Referring to the drawing in particular the invention embodied therein comprises a bifunctional seeker sensor generally designated 10 having a mounting head 12 with a longitudinal axis 14. Mounting head 12 includes internal threads 16 for receiving the external threads of a lens tube 18. Lens tube 18 has an opening which extends along the axis 14 and is provided with a lens system including a lens 20 which is convex toward the object, a second lens 22 and a third lens 24. The lenses are mounted in lens tube 18 which is threaded into mounting head 12 until electromagnetic radiation or light of a first selected shorter wavelength is focused in the area of a first detector 26. The optical system is also selected to transmit all wavelength regions or bands of interest including longer wavelength light. The detector 26 is provided with a mounting plate 28. Both detector 26 and mounting plate 28 are transparent to the other wavelength region of interest which may then propagate along axis 14 to a second detector 30.

In the preferred embodiment of the invention, the first detector 26 is a laser detector for detecting light of about 1.06 micrometers. The second detector 30 is an infrared detector for sensing light in the three to fifteen micrometer region. Nutation means are also provided in the form of a reticle 32 which is movable across the longitudinal axis 14. The reticle 32 is provided with nutation drive means generally designated 34 which in the embodiment shown comprise a pair of cranks 36 each connected to an electric motor and gearing shown only in block form at 38. The reticle thus oscillates across the axis 14. The light striking detector 30 can thus be frequency modulated in known fashion.

Once the desired focus is obtained by threading lens tube 18 into mounting head 12 the lens tube is locked to the mounting head using an internally threaded locking ring 19.

A preferred form for the nutation drive means 34 is a small d.c. drive motor which is geared down to suitable RPM by a gear train. A reference timing disc is carried on one of the cranks 36 to produce a real time reference signal to be used by demodulator electronics to determine the angular locations of the drive mechanism.

The electronics processing for the inventive bifunctional seeker sensor is similar to those used in other Texas Instruments Incorporated infrared and laser seeker devices, for example as illustrated in Fowler et al reference.

As for laser signal processing, for small angles off the optics foresight, the laser spot may be defocused to produce error signals proportional to the angular position of the target with respect to the detector electrical boresight. As to the infrared signal processing, the nutation reticle (encoder) modulates the signal and background radiation flux to provide a frequency modulated (FM) signal at the output of the detector. Processing of the detector output signals provides voltages that are proportional to the target position in the field of view.

For a better understanding of the operation of the invention, all of the aforementioned are incorporated here by reference.

While a specific embodiment of the invention has been shown and described in detail to illustrate the application of the principles of the invention, it will be understood that the invention may be embodied otherwise without departing from such principles.

What is claimed is:

1. An optical target-seeking system having a unitary sensor device capable of simultaneously detecting both infrared waves and laser light waves in the same device, said sensor device comprising:

mounting means comprising a cylindrical housing, the inside surface in one end of which is adapted to have screw threads in its inside diameter, tube-like, telescopic, lens support means for supporting a respective first, second and third lens, said support means being advancable, having threads on its outer surface which cooperate with the screw threads on the said mounting means, said support means having one end plate with a countersunk eyepiece opening therein in the end facing the direction of a target for admitting light and infrared waves therefrom; said first lens being convex on its side facing the target and flat on its other side, and stationarily mounted therein to the rear of said opening; said second lens being flat on its side facing the target and concave on its other side, and stationarily mounted in the tube support means in abutment with said first lens with said flat sides of the lenses touching; said third lens being convex on its side facing the target and concave on its other side and stationarily mounted in the tube support means open end which is opposite the said eyepiece opening, said lenses adapted to be annularly round so as to fit within said tube support means; and a locking ring means associated with said mounting means and tube support means for locking said tube at a desired positional depth within said mounting means;

transverse mounting plate fastened in said mounting means to the rear of said tube support perpendicular to the longitudinal axis;

first detector means attached on said mounting plate in the direction facing the target, aligned about the longitudinal axis for detecting laser light waves which strike it but passing infrared waves;

transverse positioning means fastened in said mounting means to the rear of said transverse mounting plate, perpendicular to the longitudinal axis;

second detector means attached on said positioning means in the direction facing the target, center aligned around the longitudinal axis, for detecting infrared waves which strike it, but not measuring laser light waves thereon;

reticle means located between said mounting plate and said second detector means for modulating infrared waves passing along said longitudinal axis before striking said second detector, whereby said infrared waves reaching said second detector means may be selectively modulated by select reciprocal movement of said reticle transversely across in a direction perpendicular to said longitudinal axis;

nutation means including drive means for moving said reticle means comprising first and second respective motor means attached to said positioning means on opposite sides of said longitudinal axis and including gear means attached to the shafts of the respective motor means and said gear means connected to said reticle means for driving it reciprocally.

2. An optical target-seeking system having a unitary sensor device capable of simultaneously detecting both infrared waves and laser light waves in the same device, said sensor device comprising:

mounting means comprising a cylindrical housing, the inside surface in one end of which is adapted to have screw threads in its inside diameter, tube-like, telescopic, lens support means for supporting a respective first, second and third lens, said support means being advancable, having threads on its outer surface which cooperate with the screw threads on the said mounting means, said support means having one end plate with a countersunk eyepiece opening therein in the end facing the direction of a target for admitting light and infrared waves therefrom; said first lens being convex on its side facing the target and flat on its other side, and stationarily mounted therein to the rear of said opening; said second lens being flat on its side facing the target and concave on its other side, and stationarily mounted in the tube support means in abutment with said first lens with said flat sides of the lenses touching; said third lens being convex on its side facing the target and concave on its other side and stationarily mounted in the tube support means open end which is opposite the said eyepiece opening, and a locking ring means associated with said mounting means and tube support means for locking said tube at a desired positioned depth within said mounting means;

transverse mounting plate fastened in said mounting means to the rear of said tube support means perpendicular to the longitudinal axis;

first detector means attached on said mounting plate in the direction facing the target, aligned about the longitudinal axis for detecting laser light waves which strike it but passing infrared waves;

transverse positioning means fastened in said mounting means to the rear of said transverse mounting plate, perpendicular to the longitudinal axis;

second detector means attached on said positioning means in the direction facing the target, center aligned about the longitudinal axis, for detecting infrared waves which strike it, but not measuring laser light waves thereon;

reticle means located between said mounting plate and said second detector means for modulating infrared waves passing along said longitudinal axis before striking said second detector, whereby said infrared waves reaching said second detector means may be selectively modulated by select movement of said reticle transversely across in a direction perpendicular to said longitudinal axis;

means for reciprocally driving said reticle means, comprising motor means communicating with a gear means and said gear means further connected to said reticle means to drive said reticle, said motor means mounted in said positioning means.

3. In an optical target-seeking system a unitary sensor device capable of simultaneously detecting both infrared waves and laser light waves in the same device, said sensor device comprising:

mounting means comprising a cylindrical housing, the inside surface in one end of which is adapted to have screw threads in its inside diameter;

tube-like, telescopic, lens support means for supporting a respective first, second and third lens, said support means being advancable, having threads on its outer surface which cooperate with the screw threads on the said mounting means, said support means having one end plate with a countersunk eyepiece opening therein in the end facing the direction of a target for admitting light and infrared waves therefrom; said first lens being convex on its side facing the target and flat on its other side, and stationarily mounted therein to the rear of said opening; said second lens being flat on its side facing the target and concave on its other side, and stationarily mounted in the tube support means in abutment with said first lens with said flat sides of the lenses touching; said third lens being convex on its side facing the target and concave on its other side and stationarily mounted in the tube support means open end which is opposite the said eyepiece opening, and a locking ring means associated with said mounting means and tube support means for locking said tube at a desired positioned depth within said mounting means;

transverse mounting plate fastened in said mounting means to the rear of said tube support means perpendicular to the longitudinal axis;

first detector means attached on said mounting plate in the direction facing the target, aligned about the longitudinal axis for detecting laser light waves which strike it but passing infrared waves;

transverse positioning means fastened in said mounting means to the rear of said transverse mounting plate, perpendicular to the longitudinal axis;

second detector means attached on said positioning means in the direction facing the target, center aligned about the longitudinal axis, for detecting infrared waves which strike it, but not measuring laser light waves thereon;

reticle means located between said mounting plate and said second detector means for modulating infrared waves passing along said longitudinal axis before striking said second detector, whereby said infrared waves reaching said second detector means may be selectively modulated by select movement of said reticle transversely across in a direction perpendicular to said longitudinal axis;

nutation means including drive means for moving said reticle means comprising first and second respective motor means attached to said positioning means and including gear means attached to the respective motor means and to said reticle means for driving said reticle reciprocally.

* * * * *